United States Patent
Namiki

(10) Patent No.: US 7,359,319 B2
(45) Date of Patent: Apr. 15, 2008

(54) SYNCHRONOUS DATA TRANSMISSION SYSTEM

(75) Inventor: Hideo Namiki, Tokyo (JP)

(73) Assignee: NEC Corporation, Tokyo (JP)

( * ) Notice: Subject to any disclaimer, the term of this patent is extended or adjusted under 35 U.S.C. 154(b) by 1338 days.

(21) Appl. No.: 09/919,873

(22) Filed: Aug. 2, 2001

(65) Prior Publication Data

US 2001/0053147 A1   Dec. 20, 2001

(30) Foreign Application Priority Data

Aug. 4, 2000  (JP)  .............................. 2000-236718

(51) Int. Cl.
*H04J 3/06* (2006.01)

(52) U.S. Cl. ..................................... 370/230; 370/503

(58) Field of Classification Search ................ 370/394, 370/503, 516, 517, 518, 386
See application file for complete search history.

(56) References Cited

U.S. PATENT DOCUMENTS

| | | | | |
|---|---|---|---|---|
| 4,843,455 | A * | 6/1989 | Suzuki ................... | 375/240.25 |
| 5,218,640 | A * | 6/1993 | Morio et al. ................ | 704/201 |
| 5,299,187 | A * | 3/1994 | Tabu et al. ................ | 370/359 |
| 5,453,986 | A * | 9/1995 | Davis et al. ................ | 370/259 |
| 5,604,737 | A * | 2/1997 | Iwami et al. ............... | 370/352 |
| 5,606,553 | A | 2/1997 | Christie et al. | |
| 5,790,538 | A | 8/1998 | Sugar | |
| 5,790,592 | A * | 8/1998 | Baik .......................... | 375/219 |
| 5,812,548 | A * | 9/1998 | Havermans et al. ......... | 370/353 |
| 5,832,031 | A * | 11/1998 | Hammons, Jr. ............. | 375/262 |
| 5,940,479 | A * | 8/1999 | Guy et al. ................ | 379/93.01 |
| 6,044,124 | A * | 3/2000 | Monahan et al. ........... | 375/376 |
| 6,307,868 | B1 * | 10/2001 | Rakib et al. ................. | 370/485 |
| 6,389,039 | B1 * | 5/2002 | Katinakis et al. ............ | 370/474 |
| 6,628,664 | B1 * | 9/2003 | Guzikevits et al. ......... | 370/465 |
| 6,658,027 | B1 * | 12/2003 | Kramer et al. .............. | 370/516 |
| 6,658,250 | B1 * | 12/2003 | Ganesan et al. ......... | 455/426.1 |
| 2002/0031086 | A1 * | 3/2002 | Welin .......................... | 370/229 |

FOREIGN PATENT DOCUMENTS

| | | |
|---|---|---|
| EP | 0 921 666 A2 | 12/1998 |
| JP | 56-034248 | 4/1981 |
| JP | 62-125728 | 6/1987 |
| JP | 63-187942 | 8/1988 |
| JP | 3-159426 | 7/1991 |
| JP | 5-183586 | 7/1993 |
| JP | 6-252906 | 9/1994 |
| JP | 7-7950 | 1/1995 |
| JP | 10-93540 | 4/1998 |
| WO | WO 95/22233 | 2/1995 |
| WO | WO 00/59166 | 3/2000 |

* cited by examiner

*Primary Examiner*—Chi Pham
*Assistant Examiner*—Kevin Mew
(74) *Attorney, Agent, or Firm*—Foley & Lardner LLP

(57) ABSTRACT

A first and a second terminals 100 and 200 are connected to an asynchronous transmission line 300. Microphones 101 and 201 and loudspeakers 102 and 202, or image input units (i.e., cameras) 111 and 211 and image output units (i.e., displays) 112 and 212, are connected to the first and second terminals 100 and 200, respectively. The terminals 100 and 200 comprise sampling clock generators 103 and 203, data generators 104 and 204, data reproducers 105 and 205, transmission buffers 106 and 206 and n- (or plural) stage reception buffers 107 and 207. Thus, it can prevent data quality deterioration due to an overflow or an underflow when transmitting such data as voice or image data between the first and the second terminals via an asynchronous transmission line.

8 Claims, 5 Drawing Sheets

SYNCHRONOUS DATA TRANSMISSION SYSTEM

BACKGROUND OF THE INVENTION

This application claims benefit of Japanese Patent Application No. 2000-236718 filed on Aug. 4, 2000, the contents of which are incorporated by the reference.

The present invention relates to synchronous data transmission systems for transmitting synchronous data via a synchronous line.

There are cases where it is desired to transmit synchronous signal varying with time, such as voice and motion picture signals among a plurality of terminals via a synchronous transmission lines. Prior art techniques concerning such synchronous data transmission are disclosed in Japanese Patent Laid-Open No. 62-125728 as "Clock Permeable Synchronous Data Transmission System", in Japanese Patent Laid-Open No. 63-187942 as "Data Transmission System" and so forth.

In such cases, the data transmission is subject to quality deterioration due to different data sampling clocks of the individual terminals. For example, when the transmission side data generation sampling clock is at a higher rate than the reception side data reproduction sampling clock, overflow of data is generated on the reception side, resulting in missing of reproduced data. On the other hand, when the reception side sampling clock is at a higher rate, underflow of data is generated, resulting in stoppage of the reproduction or missing data therein.

SUMMARY OF THE INVENTION

An object of the present invention is therefore to provide a synchronous data transmission system capable of reducing quality deterioration of data transmission due to an overflow or underflow generated by the difference between the transmission side data generation sampling clock and the reception side data reproducing sampling clock.

According to an aspect of the present invention, there is provided a synchronous data transmission system for transmitting such data as voice or image data between a first and a second terminals via an asynchronous transmission line, wherein: the first and second terminals each comprise a data generator and a data reproducer operable under control of a clock from a sampling clock generator, and a transmission buffer and a plurality of reception buffer stages connected to the data generator and the data reproducer, respectively.

According to another aspect of the present invention, there is provided a synchronous data transmission system for transmitting such data as voice or image data between a first and a second terminals via an asynchronous transmission line, wherein: the first and second terminals each comprise a data generator and a data reproducer operable under control of a clock from a sampling clock generator, and a transmission buffer and a plurality of reception buffer stages connected to the data generator and the data reproducer, respectively, and the first and second terminals each further comprise an asynchronous transmission line interface connected to the asynchronous transmission line.

The synchronous data transmission system further comprises a clock synchronizing means for synchronizing clocks generated in the sampling clock generators in the first and second terminals. The synchronous data transmission system further comprises a frequency difference eliminating means for eliminating the frequency difference between the clocks generated in the sampling clock generators in the first and second terminals. A synchronous data transmission line is connected to the data generators and the data reproducers in the first and second terminals. The sampling clock generators in the first and second terminals are controlled on the basis of the received data from the asynchronous transmission line interface.

According to other aspect of the present invention, there is provided a synchronous data transmission system comprising a first and a second terminals and a synchronous transmission line connected between first and a second terminals for voice or image communication with each other, each terminal including a voice or image input means, a sampling clock generator, an A/D converter for digitalizing the output of the voice input means, a data generator, operable with the output of the sampling clock generator, for generating data on the basis of the output of the A/D converter, a transmission buffer receiving the generated data, a plurality of reception buffer stages supplied with the received data via a asynchronous transmission line, a data reproducer operable with the output of the sampling clock generator, for reproducing data from the plurality of reception buffer stages, a D/A converter for converting the reproduced data to an analog signal, a voice or image output means for outputting voice based on the D/A converter output, the data stored in the transmission buffer having been packeted in certain time units (t) and being outputted via asynchronous transmission line interface to the asynchronous transmission line for the time unit (t), the data received from the asynchronous transmission line being stored via the asynchronous transmission line interface in the reception buffer, the data stored in the reception buffer being transmitted to the data reproducer, the reception buffer being capable of storing data received from the asynchronous transmission line for a plurality of times (n×t) in every unit time (t), and the data reproducer reproducing data when data for the plurality of times (n×t) has been stored.

The synchronous data transmission system further comprising a sampling clock synchronizing means for synchronizing the sampling clocks of the sampling clock generators in the first and second terminals by inputting the output of the sampling clock generator in one terminal to the sampling clock generator in another terminal. The frequency difference between the sampling clocks generated in the sampling clock generators in the first and second terminals is eliminated by inputting the clock from the sampling clock generator in one terminal to the sampling clock generator in another terminal. The sampling clock frequency of one terminal is made closer to the sampling clock frequency of another terminal by estimating the sampling clock on the basis of the data received from the asynchronous transmission line.

Other objects and features will be clarified from the following description with reference to attached drawings.

PREFERRED EMBODIMENTS OF THE INVENTION

Preferred embodiments of the present invention will now be described with reference to the drawings.

Figure 1:
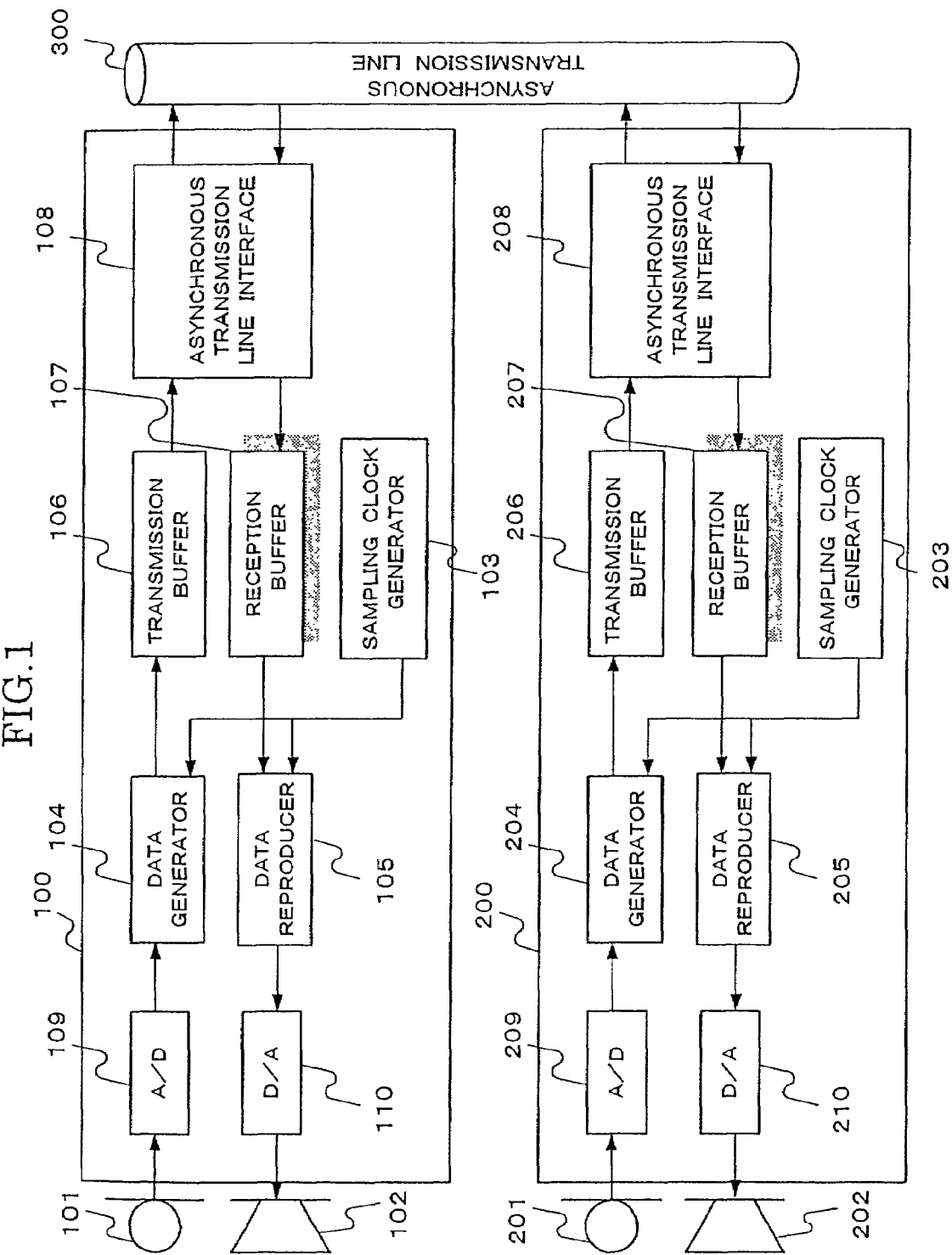
FIG. 1 is a block diagram showing the construction of a first embodiment of the synchronous data transmission system according to the present invention.

According to the present invention, in the transmission of a synchronous signal, such as a voice or a motion picture signal, between different terminals (i.e., a first and a second terminal) via an asynchronous transmission line, deterioration of the data quality is presented, which might otherwise be generated due to the difference of a transmission side data generation sampling clock and a reception side data reproduction sampling clock from each other. FIG. 1 is a block diagram showing the construction of a first embodiment of the synchronous data transmission system according to the present invention. This embodiment concerns the transmission of voice as signal transmitted and received between such terminals.

The synchronous data transmission system shown in FIG. 1 comprises a first and a second terminal 100 and 200 and a synchronous transmission line 300. Microphones 101 and 201 and loudspeakers 102 and 202 are connected to the first and second terminals 100 and 200, respectively. The first and second terminals 100, and 200 include sampling clock generators 103 and 203, data generators 104 and 204, data reproducers 105 and 205, transmission buffers 106 and 206, reception buffers 107 and 207, asynchronous transmission line interfaces 108 and 208, analog-to-digital (A/D) converters 109 and 209 and digital-to-analog (D/A) converters 110 and 210, respectively. The outputs of the sampling clock generators 103 and 203 are supplied to the data generators 104 and 204 and the data reproducers 105 and 205.

The first and second terminals 100 and 200 have voice input/output functions constituted by microphones 101 and 201 and loudspeakers 102 and 202. The first and second terminals 100 and 200 perform voice communication with each other via the asynchronous transmission line 300. At this time, the sampling clock generators 103 and 203 generate sampling clocks of voice data in the first and second terminals 100 and 200. Voices inputted from the microphones 101 and 201 are supplied to the A/D converters 109 and 209, which in turn outputs digitalized data (i.e., digital data) to the data generators 104 and 204.

The voice input signals are digitalized by using sampling clocks generated in the sampling clock generators 106 and 206. The data stored in the transmission buffers 106 and 206 have been packeted in certain time units (t). The data stored in the transmission buffers 108 and 208 are outputted via the asynchronous transmission line interfaces 108 and 208 to the asynchronous transmission line 300. This data transmission using the asynchronous line 300 is performed for the time unit (t).

The data received from the asynchronous transmission line 300 are stored via the asynchronous transmission line interfaces 108 and 208 in the reception buffers 107 and 207. The data stored in the reception buffers 107 and 207 are transmitted to the data reproducers 105 and 205. The D/A converters 110 and 210 converts the outputs of the data reproducers 105 and 205 to analog data by using the sampling clocks generated in the sampling clock generators 103 and 203, and output the analog converted data to the loudspeakers 102 and 202. The reception buffers 107 and 207 can store data received from the asynchronous transmission line 300 for a plurality of times (n×t) in every unit time (t). The data reproducers 105 and 205 reproduce data when data for the plurality of times (n×t) has been stored.

The operation of the synchronous data transmission system shown in FIG. 1 will now be described. A case will be considered, in which the first terminal 100 transmits voice data via the asynchronous transmission line 300 to the second terminal 200. The A/D converter 109 converts the data inputted as analog data from the microphone 101 to digital data. The conversion of the along to the digital data is performed by using the sampling clock generated in the sampling clock generator 103 in the first terminal 100. At this time, the frequency of the sampling clock is chosen to be f1 (Hz), and the accuracy of conversion is chosen to be m bits.

The generator 104 executes data processing on the data sampled in the A/D converter 109 to generate packets each for each unit of processing in the asynchronous transmission line 300. This data processing is performed in units of times t (s). The data quantity w is expressed with t/f1*m bits. The data w is stored in the transmission buffer 106, and is outputted via the asynchronous transmission interface 108 to the asynchronous transmission line 300 for each time t.

The data outputted to the asynchronous transmission line 300 is stored via the asynchronous transmission line interface 208 of the second terminal 200 in the reception buffer 207 therein. The reception buffer 207 has n buffer stages, and upon w data receipt (n−1) times from the asynchronous transmission line 300, it transmits data in units of m bits to the data reproducer 205. The data reproducer 205 reproduces data by using the sampling clock generated in the sampling clock generator 203 in the second terminal 200. The frequency of the sampling clock at this time is chosen to be f2 (Hz).

As for the data quantity w that is transferred via the asynchronous transmission line 300, the time t1 of data generation in the first terminal 100 is expressed as w*f1/m, and the time t2 of data generation in the second terminal 200 is expressed as w*f2/m. Where the sampling frequencies in the first and second terminals 100 and 200 are the same (i.e., f1=f2), t1=t2. The voice inputted from the microphone 101 of the first terminal 100 is outputted without interruption from the loudspeaker 202 of the second terminal 200.

Actually, the sampling frequencies in the first and second terminals are not perfectly the same. Where f1>f2, overflow of the received data occurs. Where f1<f2, underflow of the received data occurs. In either case, missing of voice occurs. Where the reception buffer 207 shown in FIG. 1 is an n-stage buffer, it is possible to obtain a structure, which is less subject to underflow and overflow. Denoting Δf=f1−f2, when Δf is positive, overflow occurs with t/Δf(s) in the reception buffer 207 as one-stage buffer.

Where the reception buffer 207 is an n-stage buffer, overflow occurs therein with n*t/Δf(s). When Δf is negative, underflow occurs with t/Δf(s) in the reception buffer 207 as one-stage buffer. On the other hand, underflow occurs with n*t/Δf(s) in the reception buffer 207 as n-stage buffer. It will be seen that it is possible to extend the time until the overflow or underflow by n times and thus improve the quality of the synchronous data such as voice data.

Figure 2:
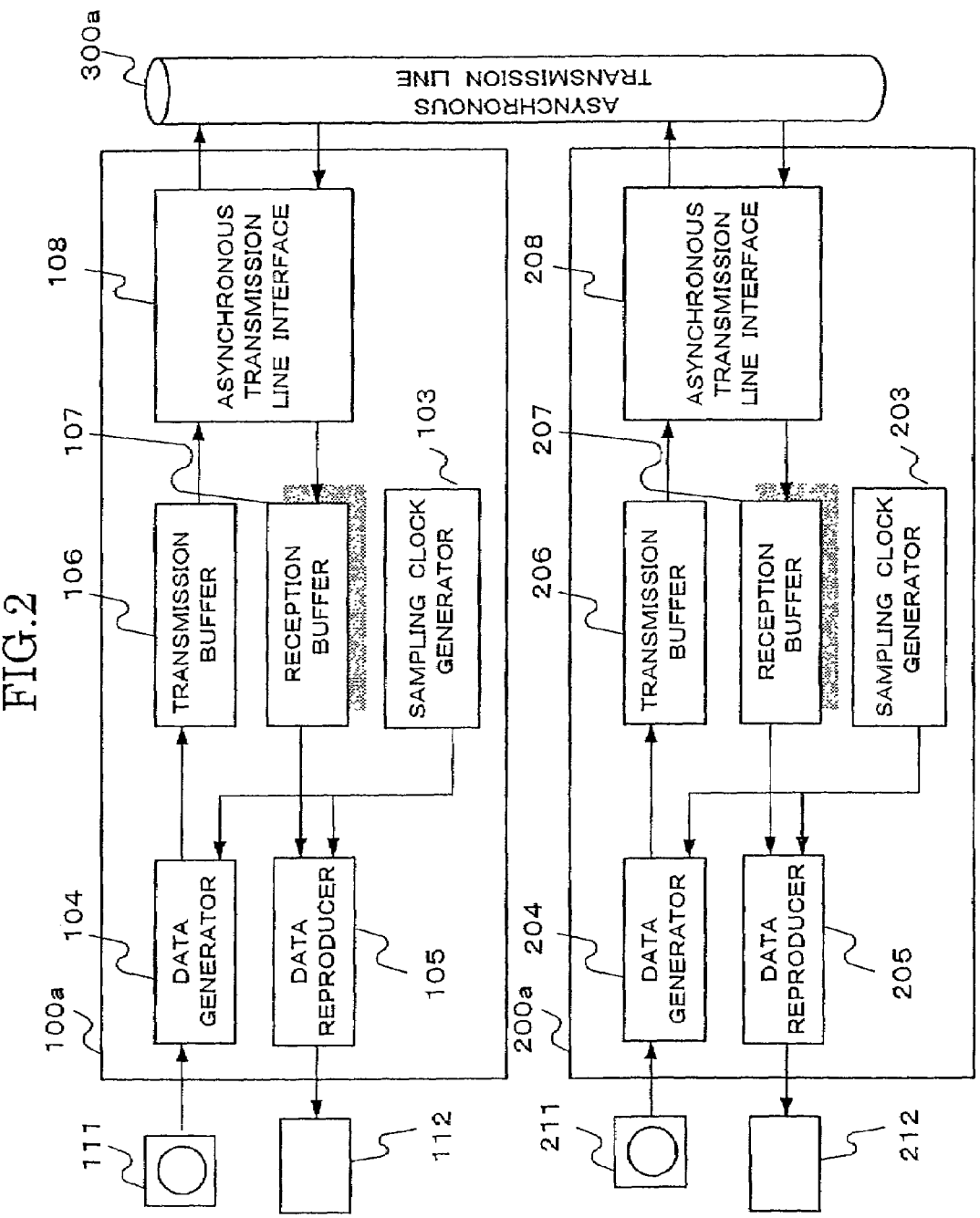
FIG. 2 shows an embodiment, in which motion picture is transferred between the first and second terminals by using the asynchronous transmission line.
Figure 3:
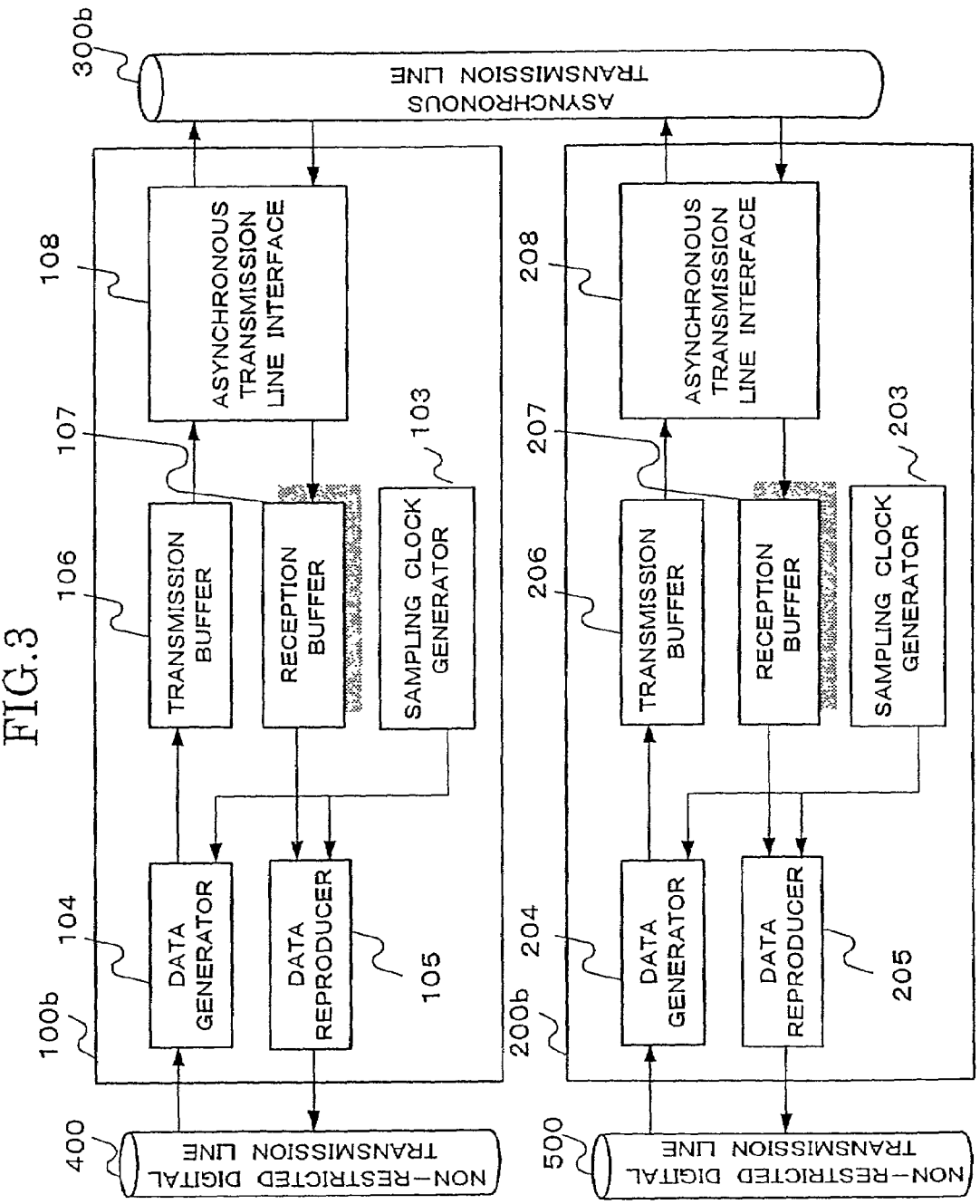
FIG. 3 shows an embodiment, in which synchronous non-restricted digital communication line data of ISDN (integrated service digital network) or the like is transferred by using the asynchronous transmission line.

Other embodiments of the synchronous data transmission system according to the present invention will now be described with reference to FIGS. 2 to 5. FIG. 2 shows an embodiment, in which motion picture is transferred between the first and second terminals by using the asynchronous transmission line. FIG. 3 shows an embodiment, in which synchronous non-restricted digital communication line data of ISDN (integrated service digital network) or the like is transferred by using the asynchronous transmission line. The operations of these embodiments are substantially the same as in the case of FIG. 1. In these embodiments, constituent elements corresponding to those in the above first embodiment are designated by like reference numerals.

The second embodiment of the synchronous data transmission system according to the present invention shown in FIG. 2 comprises a first and a second terminal 100a and 200a and an asynchronous transmission line 300a. Image input units (i.e., cameras) 111 and 211 and image output units (i.e., displays) 112 and 212 are connected to the first and second terminals 100a and 200a, respectively. The first and second terminals 100a and 200a and the asynchronous transmission line 300a are the same as the corresponding elements in the first embodiment. In this embodiment, however, the A/D converters 109 and 209 and the D/A converters 110 and 210 shown in FIG. 1 are not provided.

The third embodiment of the synchronous data transmission system shown in FIG. 3 according to the present invention comprises a first and a second terminal 100b and 200b and an asynchronous transmission line 300b. Synchronous non-restricted digital transmission lines 400 and 500 are connected to the first and second terminals 100b and 200b. The first and second terminals 100b and 200b and the asynchronous transmission line 300b are the same and operate in the same way as the first and second terminals 100a and 200a and the asynchronous transmission line 300a, respectively, in the second embodiment.

Figure 4:
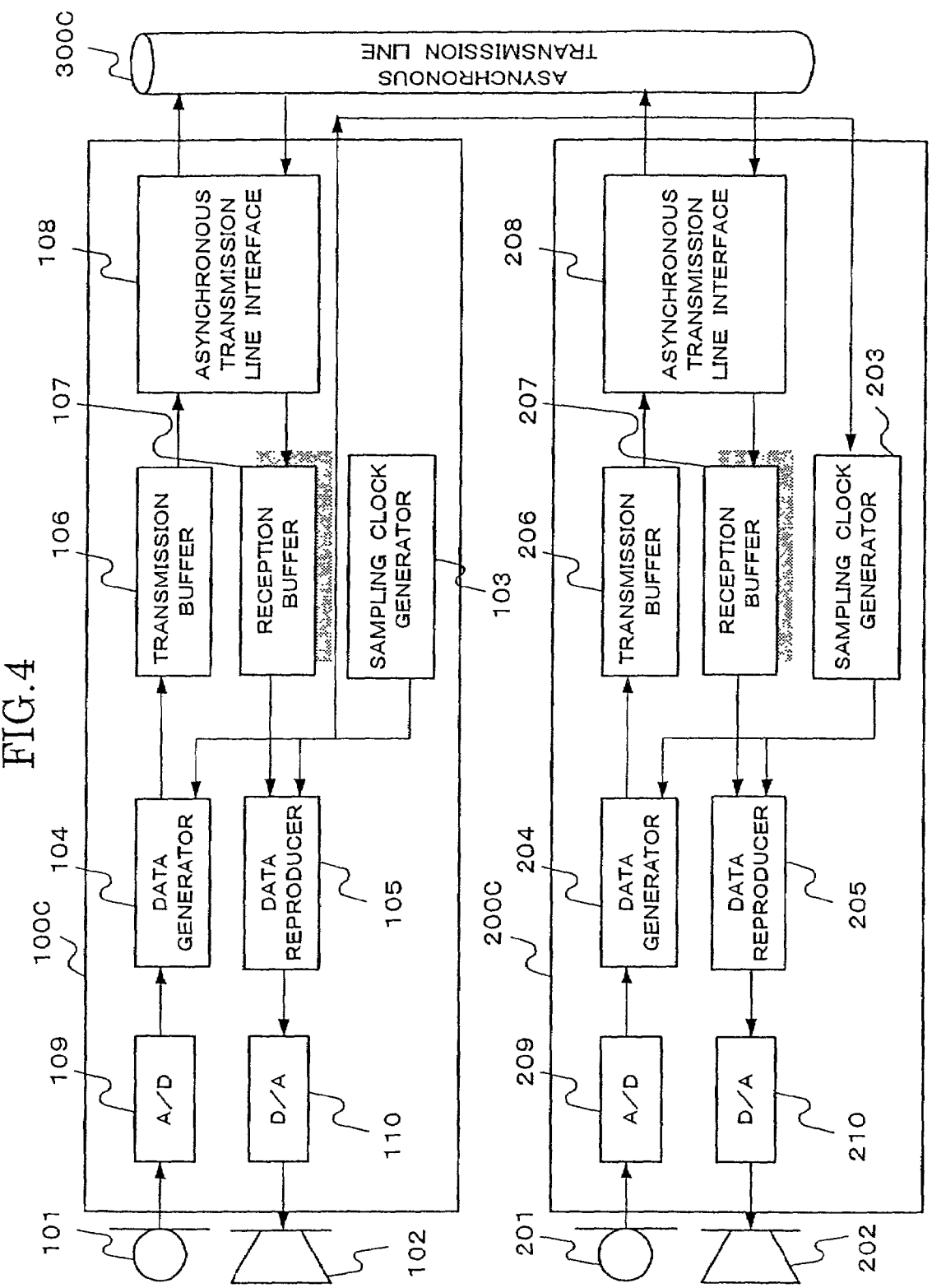
FIG. 4 is a block diagram showing the construction of a third embodiment of the synchronous data transmission system according to the present invention.

FIG. 4 is a block diagram showing the construction of a third embodiment of the synchronous data transmission system according to the present invention. This synchronous data transmission system comprises a first and a second terminal 100c and 200c and an asynchronous transmission line 300c. Like the case of the first and second terminals 100 and 200 shown in FIG. 1, microphones 101 and 202 and loudspeakers 102 and 202 are connected to the first and second terminals 100c and 200c. This third embodiment is different from the first embodiment shown in FIG. 1 in that it has a sampling clock synchronizing means (such as a well-known PLL, phase-locked loop circuit or the like) for synchronizing the sampling clocks of the sampling clock generators 103 and 203 in the first and second terminals 100c and 200c by inputting the output of the sampling clock generator 103 to the sampling clock generator 203.

Such sampling clock synchronizing means is applicable to the second and third embodiments shown in FIGS. 2 and 3 as well. In the case of the fourth embodiment shown in FIG. 4, the frequency difference between the sampling clocks generated in the sampling clock generators 103 and 203 in the first and second terminals 100c and 200c is eliminated by inputting the clock from the sampling clock generator 103 in the second terminal 100c to the sampling clock generator 203 in the second terminal 200c. With this function, it is possible to further reduce Δf as described before in connection with the first embodiment shown in FIG. 1 and further alleviate the deterioration of the data quality compared to the first embodiment.

Figure 5:
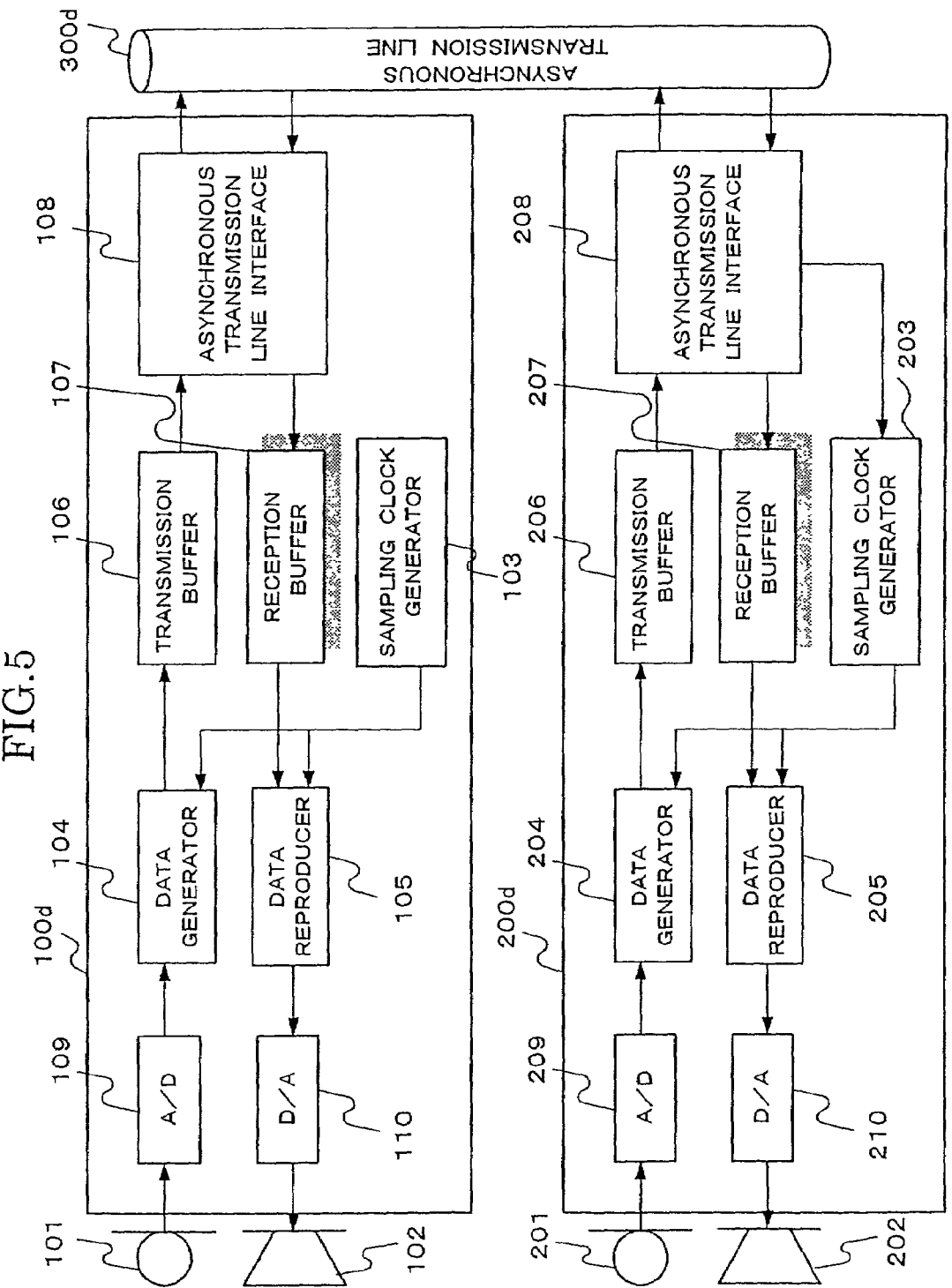
FIG. 5 is a block diagram showing the construction of a fifth embodiment of the synchronous data transmission system according to the present invention.

FIG. 5 is a block diagram showing the construction of a fifth embodiment of the synchronous data transmission system according to the present invention. This embodiment comprises a first and a second terminal 100d and 200d and asynchronous transmission line 300d. Microphones 101 and 201 and loudspeakers 102 and 202 are connected to the first and second terminals 100d and 200d. In this fifth embodiment, the first terminal 100d and the asynchronous transmission line 300d are the same as the corresponding elements in the first embodiment. In the second terminal 200d, however, the data deterioration is further reduced in such a manner as to make the sampling clock frequency of the second terminal 200d closer to the sampling clock frequency of the first terminal 100d by estimating the sampling clock of the first terminal 100d on the basis of the data received from the asynchronous transmission line 100d.

As described before in connection to FIG. 1, the data outputted from the first terminal 100d to the asynchronous transmission line 300d is transmitted in units of times t (s). The unit time t is measured in the terminal 100d, and different from time t2 measured in the second terminal 200d. This time difference is estimated in the asynchronous transmission line interface 208 and the sampling clock generator 203. Then, Δf=f1−f2 is reduced by having f2 approximate f1, i.e., the frequency of the sampling clock generated in the sampling clock generator 103 in the terminal 100d. The data quality deterioration is further reduced with this function along with the construction of the first embodiment shown in FIG. 1. Particularly, the fifth embodiment has an effect that the data quality deterioration is reduced even with reduction of the number n of stages of the reception buffers 107 and 207 shown in FIG. 1.

As has been described in the foregoing, with the synchronous data transmission system according to the present invention it is possible to obtain the following pronounced practical advantages. By transmitting synchronous data via the asynchronous transmission line, it is possible to alleviate the deterioration of the synchronous data due to overflow and underflow of data generated by a clock slip. The construction of preventing the synchronous data quality deterioration due to the clock slip is very simple. In the transfer of data an asynchronous communication line, i.e., a communication line other than the synchronous communication line, the transfer of synchronous data is possible while alleviating the data quality deterioration.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A synchronous data transmission system comprising:
   a first terminal;
   a second terminal; and
   a synchronous transmission line connected between the first and second terminals for voice or image communication with each other,
   each terminal including a voice or image input means, a sampling clock generator, an A/D converter for digitalizing the output of the voice input means, a data generator, operable with the output of the sampling clock generator, for generating data on the basis of the output of the A/D converter, a transmission buffer receiving the generated data, a plurality of reception buffer stages supplied with the received data via an asynchronous transmission line, a data reproducer operable with the output of the sampling clock generator, for reproducing data from the plurality of reception buffer stages, a D/A converter for converting the reproduced data to an analog signal, a voice or image output means for outputting voice based on the D/A converter output, the data stored in the transmission buffer having been packeted in certain time units and being outputted via asynchronous transmission line interface to the asynchronous transmission line for the time unit, the data received from the asynchronous transmission line being stored via the asynchronous transmission line interface in the plurality of reception buffer stages, the data stored in the plurality of reception buffer stages being transmitted to the data reproducer, the plurality of reception buffer stages being capable of storing data received from the asynchronous transmission line for a plurality of times in every unit time, and the data reproducer reproducing data when data for the plurality of times has been stored; and a sampling clock synchronizing means for synchronizing the sampling clocks of the sampling clock generators in the first and second terminals by inputting the output of the sampling clock generator in one terminal to the sampling clock generator in another terminal.

2. A synchronous data transmission system comprising:
a first terminal;
a second terminal; and
a synchronous transmission line connected between the first and second terminals for voice or image communication with each other,
each terminal including a voice or image input means, a sampling clock generator, an A/D converter for digitalizing the output of the voice input means, a data generator, operable with the output of the sampling clock generator, for generating data on the basis of the output of the A/D converter, a transmission buffer receiving the generated data, a plurality of reception buffer stages supplied with the received data via an asynchronous transmission line, a data reproducer operable with the output of the sampling clock generator, for reproducing data from the plurality of reception buffer stages, a D/A converter for converting the reproduced data to an analog signal, a voice or image output means for outputting voice based on the D/A converter output, the data stored in the transmission buffer having been packeted in certain time units and being outputted via asynchronous transmission line interface to the asynchronous transmission line for the time unit, the data received from the asynchronous transmission line being stored via the asynchronous transmission line interface in the plurality of reception buffer stages, the data stored in the plurality of reception buffer stages being transmitted to the data reproducer, the plurality of reception buffer stages being capable of storing data received from the asynchronous transmission line for a plurality of times in every unit time, and the data reproducer reproducing data when data for the plurality of times has been stored, wherein the frequency difference between the sampling clocks generated in the sampling clock generators in the first and second terminals is eliminated by inputting the clock from the sampling clock generator in one terminal to the sampling clock generator in another terminal.

3. The synchronous data transmission system according to claim 1, wherein the sampling clock frequency of one terminal is made closer to the sampling clock frequency of another terminal by estimating the sampling clock on the basis of the data received directly from the asynchronous transmission line without having been processed in any manner by the one terminal.

4. The synchronous data transmission system according to claim 1, wherein the plurality of reception buffer stages are configured to handle both data underflow and data overflow, without loss of data, due to different sampling clock rates output by the respective sampling clock generator provided in the first and second terminals.

5. The synchronous data transmission system according to claim 1, wherein the plurality of reception buffer stages are solely supplied with the reception data from the asynchronous transmission line and do not receive any data from the synchronous transmission line.

6. The synchronous data transmission system according to claim 2, wherein the sampling clock frequency of one terminal is made closer to the sampling clock frequency of another terminal by estimating the sampling clock on the basis of the data received directly from the asynchronous transmission line without having been processed in any manner by the one terminal.

7. The synchronous data transmission system according to claim 2, wherein the plurality of reception buffer stages are configured to handle both data underflow and data overflow, without loss of data, due to different sampling clock rates output by the respective sampling clock generator provided in the first and second terminals.

8. The synchronous data transmission system according to claim 2, wherein the plurality of reception buffer stages are solely supplied with the reception data from the asynchronous transmission line and do not receive any data from the synchronous transmission line.

* * * * *